US012661722B2

(12) United States Patent      (10) Patent No.: US 12,661,722 B2
Ishitani et al.                    (45) Date of Patent: Jun. 23, 2026

(54) DEBURRING TOOL

(71) Applicant: SUGINO MACHINE LIMITED, Namerikawa City (JP)

(72) Inventors: Akihiro Ishitani, Namerikawa City (JP); Mitsuru Muto, Namerikawa City (JP)

(73) Assignee: SUGINO MACHINE LIMITED, Namerikawa City (JP)

( * ) Notice: Subject to any disclaimer, the term of this patent is extended or adjusted under 35 U.S.C. 154(b) by 460 days.

(21) Appl. No.: 18/446,972

(22) Filed: Aug. 9, 2023

(65) Prior Publication Data

US 2024/0075541 A1      Mar. 7, 2024

(30) Foreign Application Priority Data

Aug. 30, 2022   (JP) ................................. 2022-136517

(51) Int. Cl.
 B23B 51/10 (2006.01)
 B23B 31/08 (2006.01)
(52) U.S. Cl.
 CPC .......... B23B 51/101 (2013.01); B23B 31/083 (2013.01)
(58) Field of Classification Search
 CPC . B23B 31/083; B23B 51/101; B23C 2220/20; B23C 3/12; B23C 5/10; B23C 3/126; B24B 9/00; B24B 41/04; B24B 47/16
 See application file for complete search history.

(56) References Cited

U.S. PATENT DOCUMENTS

| | | | | |
|---|---|---|---|---|
| 808,981 | A | * | 1/1906 | Goodrich .............. B23B 31/083 |
| | | | | 408/141 |
| 11,376,673 | B2 | * | 7/2022 | Muto ........................ B23C 3/12 |
| 2021/0107071 | A1 | | 4/2021 | Muto et al. |
| 2023/0124359 | A1 | * | 4/2023 | Yanagihara ......... B23B 31/1071 |
| | | | | 279/79 |

FOREIGN PATENT DOCUMENTS

| | | | |
|---|---|---|---|
| CN | 113118512 A | 7/2021 | |
| DE | 108046 A1 | 9/1974 | |
| EP | 3819075 A1 * | 5/2021 | ......... B23B 31/1071 |
| JP | S504910 B1 * | 2/1975 | |
| JP | S57-100452 U | 6/1982 | |

(Continued)

OTHER PUBLICATIONS

Translation of JP-2012071387-A (Year: 2012).*

(Continued)

*Primary Examiner* — Jacob J Cigna

(74) *Attorney, Agent, or Firm* — United IP Counselors, LLC

(57)      ABSTRACT

A deburring tool includes: a body having a cylinder bore; an anti-rotation body protruding toward inside of the cylinder bore; a cylindrical slide shaft reciprocable inside the cylinder bore, and an elastic body urges the slide shaft toward a cutting depth direction. The slide shaft includes a guide groove having a displacement width for the slide shaft to axially displaceable with respect to the anti-rotation body, and the guide groove moves the slide shaft with respect to the body in an opposite direction to the cutting depth direction as the guide groove receives cutting resistance.

16 Claims, 9 Drawing Sheets

(56)               References Cited

FOREIGN PATENT DOCUMENTS

| JP | S60-014840 U | | 1/1985 |
|----|--------------|---|---------|
| JP | H0666924 U | * | 9/1994 |
| JP | H09-236162 A | | 9/1997 |
| JP | 2000-015508 A | | 1/2000 |
| JP | 2000-187950 A | | 7/2000 |
| JP | 2005-349549 A | | 12/2005 |
| JP | 2012-071405 A | | 4/2012 |
| JP | 2012071387 A | * | 4/2012 |
| JP | 2013154428 A | * | 8/2013 |
| JP | 2013-184285 A | | 9/2013 |
| JP | 2019-158110 A | | 9/2019 |

OTHER PUBLICATIONS

Office Action mailed on Dec. 12, 2024 in a corresponding Korean Patent Application No. 10-2023-0102844 (4 pages).
German Office Action received on Jan. 25, 2024 in a corresponding German Patent Application No. 102023117854.7 (6 pages).

* cited by examiner

117

117b

117a

117e

117f

117d

117c

DEBURRING TOOL

CROSS-REFERENCE TO RELATED APPLICATIONS

This application claims the benefit of priority to Japanese Patent Application No. 2022-136517, filed on Aug. 30, 2022, the entire contents of which are hereby incorporated by reference.

BACKGROUND

1. Technical Field

The present invention relates to a deburring tool.

2. Description of the Background

Japanese patent application publication No. JP 2012-71387 A (hereinafter, Patent Literature 1) discloses a rotary tool. In the rotary tool of Patent Literature 1, a core shaft is fitted in a support sleeve that receives rotational power and is urged toward a distal end side of the support sleeve so that the workpiece contact portion protrudes toward the distal end of the support sleeve. When the core shaft receives the load torque from the workpiece by the basal guide screwing means between the support sleeve and the core shaft, the core shaft linearly moves toward the basal end side in the support sleeve while rotating with respect to the support sleeve.

BRIEF SUMMARY

When deburring is performed using the tool of Patent Literature 1, if the distance of the burr generating portion with respect to the support sleeve varies, the expansion and contraction of the core shaft cannot follow, and thus the deburring may not be performed in some cases.

An object of the present invention is to provide a deburring tool that enables expansion and contraction of a core shaft (slide shaft) to follow a shape of workpiece even when a distance between a target portion of deburring and a support sleeve (body) varies.

A first aspect of the present invention provides a deburring tool including:

a body having a cylinder bore;

an anti-rotation body protruding toward inside of the cylinder bore;

a cylindrical slide shaft to which a tip tool is attachable, the slide shaft configured to reciprocate inside the cylinder bore, the slide shaft including, a guide groove located on an outer cylindrical surface to receive the anti-rotation body, the guide groove having a displacement width for the slide shaft to axially displaceable with respect to the anti-rotation body, the guide groove configured to move the slide shaft with respect to the body in an opposite direction to a cutting depth direction of the tip tool as the guide groove receives cutting resistance; and an elastic body configured to urge the slide shaft toward the cutting depth direction.

Preferably, the slide shaft includes a plurality of guide grooves. The plurality of guide grooves are arranged rotationally symmetrically about a central axis of the body. The slide shaft may include an integer multiple number of guide grooves as the number of the anti-rotation body.

The displacement width of the displacement amount with respect to the angular displacement of the slide shaft may vary in accordance with the angular displacement. The displacement width may be narrowest at the end of the sliding shaft in the cutting depth direction (natural position) and wider as the sliding shaft advances in the opposite direction of the cutting depth direction. For example, a position where the slide shaft is located at an end portion in the cutting depth direction may be set as an origin, and a displacement width may be a linear function of an angular displacement.

Preferably, the deburring tool has a plurality of anti-rotation bodies. The plurality of anti-rotation bodies are arranged rotationally symmetrically about a central axis of the body. The anti-rotation body may be a pin extending in a radial direction of the body. The pin protrudes inwardly of the cylinder bore.

The slide shaft and the tip tool may be integrally formed. The tip tool may be a brush or a grindstone.

The deburring tool according to the present invention enables expansion and contraction of the slide shaft to follow the shape of workpiece even when the target portion of deburring is separated from the body.

DETAILED DESCRIPTION

First Embodiment

Figure 1:
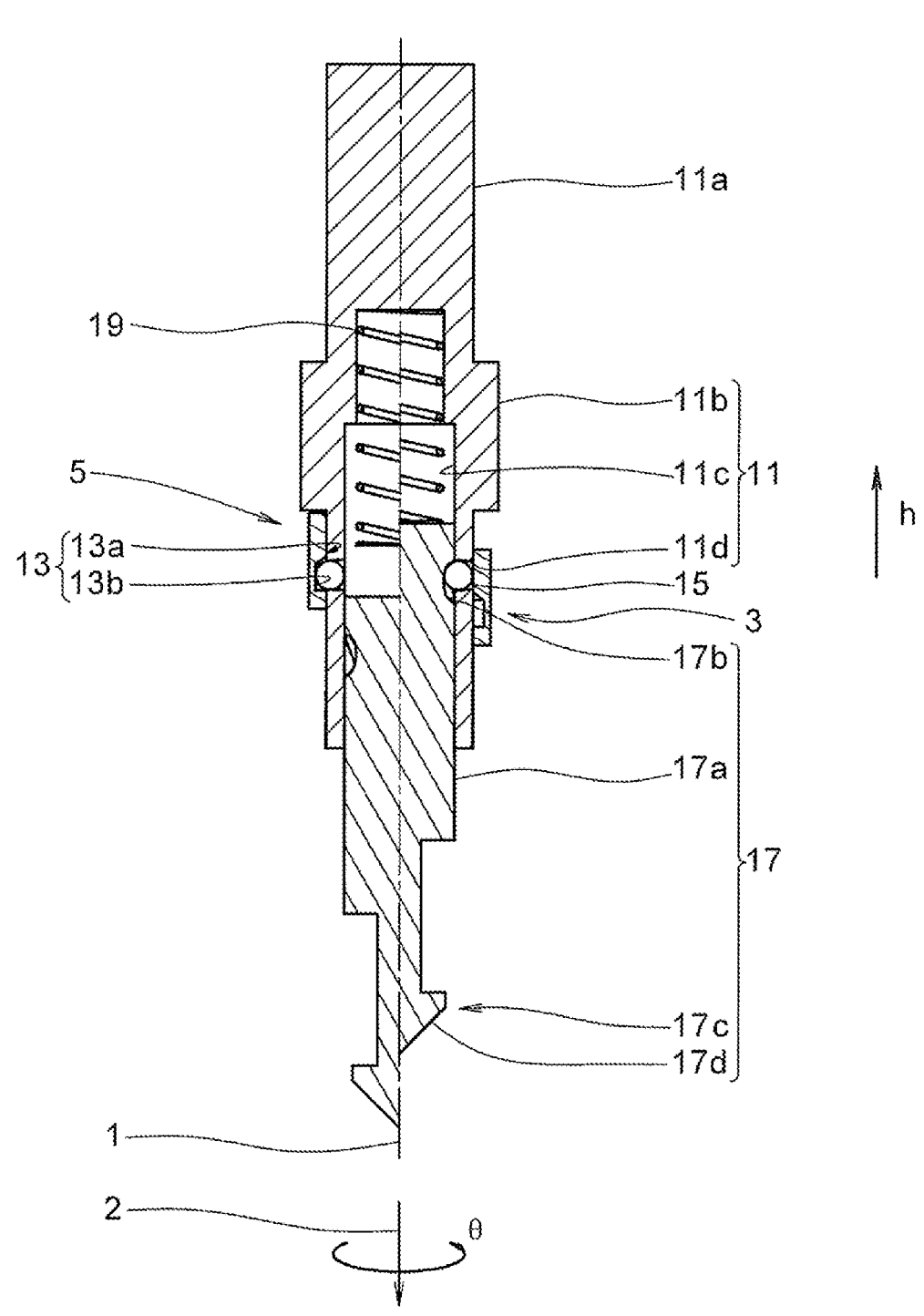
FIG. 1 is a longitudinal sectional view of a deburring tool according to a first embodiment.

As shown in FIG. 1, a deburring tool 10 according to the present embodiment includes a body 11, a trigger 13, a ball (anti-rotation body) 15, a slide tool 17, and a compression coil spring (elastic body) 19. The trigger 13 may be omitted. The right half of FIG. 1 shows a state in which the trigger 13 is located at a machining position 3 and the slide tool 17 is attached on the body 11. The left half of FIG. 1 shows a state in which the trigger 13 is located at a detachable position 5 and the slide tool 17 is being detached from the body 11. A cutting depth direction 2 of the deburring tool 10 is toward the distal end. The deburring tool 10 rotates in a clockwise direction as viewed toward the distal end (downward in FIG. 1). The deburring tool 10 scrapes the burr toward the distal end. The deburring tool 10 performs deburring on the front side of the workpiece 7 (see FIG. 4) as viewed from the deburring tool 10.

The body 11 has a hollow cylindrical shape centered on a central axis 1. The body 11 includes a shank 11a, a cylinder 11b, and a plurality of anti-rotation holes 11d. The shank 11a is connected to the cylinder 11b. The cylinder 11b has a circular cross-section. The cylinder 11b has a cylinder bore 11c. The cylinder bore 11c opens to the distal end of the body 11. The cylinder bore 11c extends along the central axis 1. The anti-rotation hole 11d penetrates from the outer cylinder surface of the cylinder 11b to the cylinder bore 11c in the central portion of the cylinder 11b. The plurality of anti-rotation holes 11d are arranged rotationally symmetrically with respect to the central axis 1.

Figure 2:
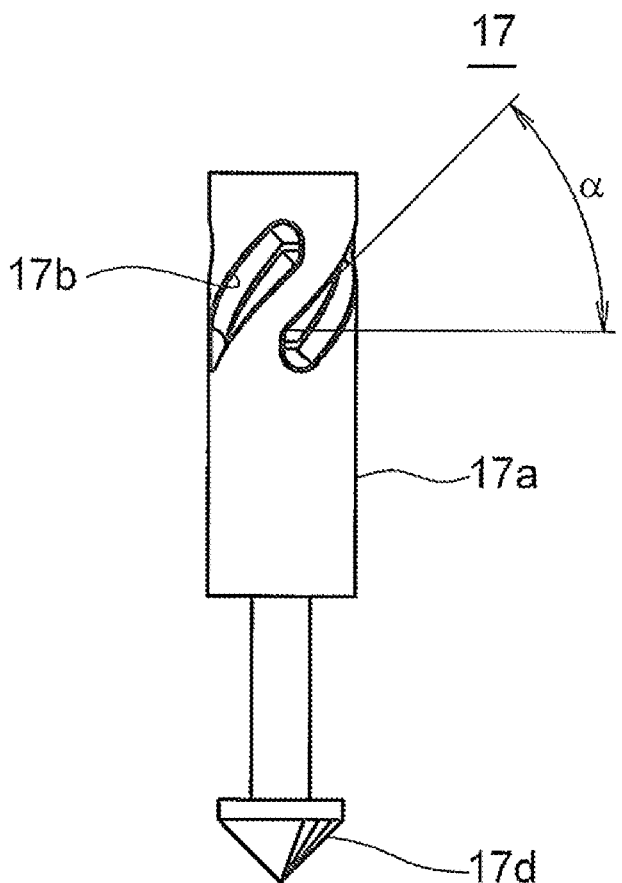
FIG. 2 is a front view of a slide tool according to the first embodiment.

As shown in FIG. 2, the slide tool 17 includes a slide shaft 17a, a guide groove 17b, and a tip tool 17c.

The slide shaft 17a is cylindrical. The slide shaft 17a is slidably inserted into the cylinder bore 11c.

The guide groove 17b is spiral. The guide groove 17b is located on the outer cylindrical surface of the slide shaft 17a. In FIG. 2, the slide tool 17 receives a cutting resistance in a counterclockwise direction as viewed from the top to the bottom. Thus, the guide groove 17b as a whole draws a spiral toward the opposite direction of the cutting depth direction 2 (upward in FIG. 2) as it advances in the opposite direction (+θ) in the rotational direction of the deburring tool 10. Preferably, the slide tool 17 has a plurality of guide grooves 17b. The plurality of guide grooves 17b are arranged rotationally symmetrically with respect to the central axis 1.

The tip tool 17c is disposed at the distal end of the slide shaft 17a. The tip tool 17c may be replaceably attached to the slide shaft 17a. The tip tool 17c includes a cutting edge 17d facing toward the distal end of the tip tool 17c.

As shown in FIG. 1, the balls 15 are inserted into the corresponding anti-rotation holes 11d. The ball 15 is supported radially inward by the trigger 13. The diameter of the ball 15 is substantially equal to the diameter of the anti-rotation hole 11d. For example, the the ball 15 has a diameter of 2 to 5 mm. The ball 15 is received in the guide groove 17b to restrict the movement of the slide shaft 17a. The ball 15 contacts a bottom surface or a side surface of the guide groove 17b to perform a sliding movement with respect to the slide shaft 17a. The ball 15 transmits the rotation and torque of the body 11 to the slide tool 17. The guide groove 17b has an axial length with respect to the ball 15. The slide shaft 17a can perform a spiral movement along the guide groove 17b and an axial reciprocating movement with respect to the body 11.

The trigger 13 has a holding surface 13a and a relief portion 13b. The trigger 13 has a hollow cylindrical shape. The trigger 13 surrounds an outer periphery of the body 11. The trigger 13 axially reciprocates between the machining position 3 and the detachable position 5 with respect to the body 11.

As shown in the right half of FIG. 1, when the trigger 13 is positioned at the machining position 3, the holding surface 13a presses the ball 15 against the guide groove 17b located radially inward. The holding surface 13a holds the ball 15 so that the ball 15 does not move radially outward by centrifugal force when the deburring tool 10 rotates.

As shown in the left half of FIG. 1, when the trigger 13 is positioned at the detachable position 5, the relief portion 13b is positioned radially outward of the anti-rotation hole 11d. At this time, the ball 15 moves radially outward to be received in the relief portion 13b. The ball 15 is entirely pulled out of the cylinder bore 11c and the slide tool 17 is removed from the cylinder bore 11c. At this time, the slide tool 17 is attachable to the cylinder bore 11c.

The trigger 13 may be urged by the elastic body so that the trigger 13 is positioned at the machining position 3 in a normal state. The trigger 13 may be fastened to the body 11 by screws, a retaining ring or other fasteners.

The compression coil spring 19 is mounted between the cylinder bore 11c and the slide tool 17. The compression coil spring 19 urges the slide tool 17 toward the distal end.

Figure 3:
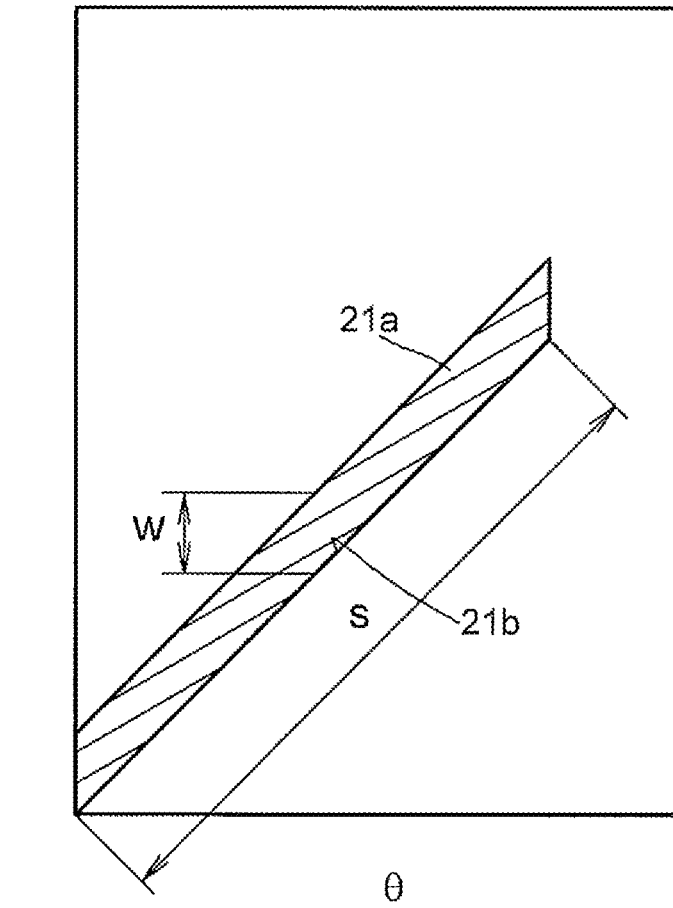
FIG. 3 shows a displacement curve of the slide shaft according to the first embodiment.

FIG. 3 shows the relation between a position and a rotational angle of the slide shaft 17a with respect to the body 11. The vertical axis represents an axial displacement amount h (see FIG. 1) of the slide shaft 17a, where the cutting depth direction 2 of the slide tool 17 is negative. The horizontal axis represents the angular displacement θ (see FIG. 1) of the slide shaft 17a, where the rotational direction of the deburring tool 10 (clockwise direction as viewed toward the downward direction in FIG. 1) is negative. The slide shaft 17a moves within the hatched area 21a in FIG. 3. In the area 21a, the displacement amount h has a constant displacement width w with respect to any angular displacement θ. In the upper end and the lower end 21b of the displacement width w, the displacement amount h may be proportional to the angular displacement θ of the slide shaft 17a. At this time, the lower end 21b and the upper end of the displacement h have the same lead angle α (see FIG. 2). The lead angle α ranges from 20 degrees to 45 degrees. For example, the displacement width w is 1 mm to 3 mm (including both ends). The displacement width w is determined by the quantity by which the slide shaft 17a moves axially when the slide shaft 17a is about to move. If the displacement width w is too large, the displacement amount h is less likely to respond in accordance with the cutting torque T. When the displacement width w is too small, the slide shaft 17a is less likely to move smoothly when the tip tool 17c contacts the workpiece 7 or is separated from the workpiece 7.

The slide shaft 17a has two degrees of freedom, that is, a spiral direction and an axial direction. When the rotational position of the slide tool 17 with respect to the body 11 does not change, the slide tool 17 is axially movable by the displacement width w. The slide tool 17 is movable by a length S along the spiral direction with respect to the body 11.

The shank 11a is mounted on a machine tool or a robot. For example, the shank 11a is mounted to a spindle of a machining center (not shown) to rotate the deburring tool 10. With the tip tool 17c of the rotating deburring tool 10 being applied to the workpiece 7, the deburring is performed by moving laterally.

Figure 4:
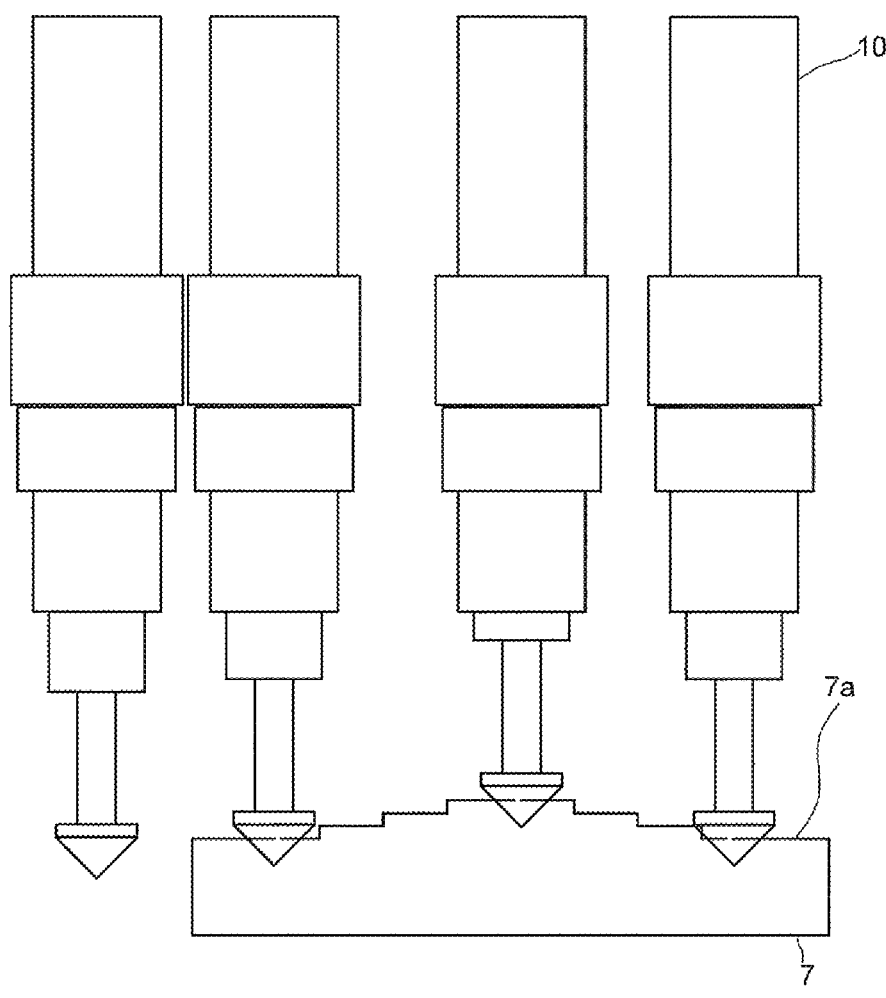
FIG. 4 shows a state of using the deburring tool according to the first embodiment.

FIG. 4 shows a situation in which the workpiece 7 is deburred by the deburring tool 10. The workpiece 7 has a stepped deburring target portion 7a. The workpiece 7 is fixed to a table (not shown). The deburring tool 10 is moved on the plane along the surface shape of the workpiece 7 while rotating. Then, the slide tool 17 expands and contracts with respect to the body 11a nd follows the deburring target portion 7a.

Figure 5:
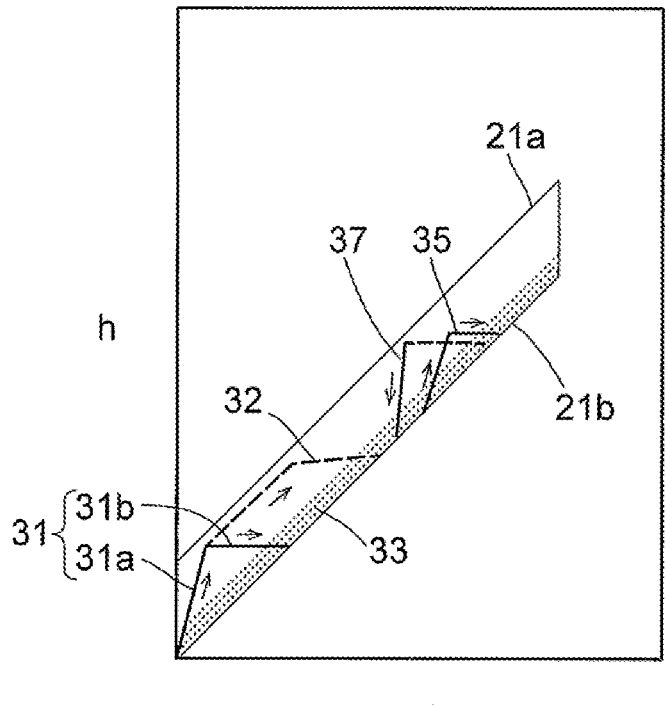
FIG. 5 shows a displacement curve showing the amount of displacement of the slide tool in use as shown in FIG. 4.

FIG. 5 shows the relation between the angular displacement θ and the displacement amount h of the slide shaft 17a at the beginning of machining and during machining. FIG. 5 shows the position of the slide shaft 17a as viewed from an observer moving together with the body 11. The deburring tool 10 rotates at a high rotational speed (for example, 10,000 to 30,000 RPM) and perform cutting by receiving the cutting torque T and the elastic force of the compression coil spring.

In a natural condition, the slide tool 17 is pressed toward the distal end by the compression coil spring 19, and the ball 15 is positioned at the basal end of the guide groove 17b. While the deburring tool 10 rotates, the body 11 approaches the workpiece 7. When the tip tool 17*c* is pressed against the workpiece 7, the tip tool 17*c* receives the cutting torque T from the workpiece 7. While the rotational speed of the slide shaft 17*a* is slightly lower than the rotational speed of the body 11, the slide tool 17 contracts toward basal end. At this time, the slide shaft 17*a* passes through a trajectory 31*a*. Then, the ball 15 comes into contact with the guide groove 17*b* due to the rotational delay of the slide shaft 17*a*. At this time, the slide shaft 17*a* passes through a trajectory 31*b*, for example. Torque is transmitted from the body 11 to the slide tool 17 via the ball 15.

When the pressing amount is large, the slide tool 17 passes through, for example, a trajectory 32 at the beginning of the machining of the slide tool 17.

When torque is transmitted from the body 11 to the slide tool 17, the slide tool 17 is located along the lower end 21*b* of the area 21*a*. It passes through various trajectories depending on the cutting conditions during machining. When the slide tool 17 gradually expands and contracts, and when the slide tool 17 is actually processing the workpiece 7, the slide tool 17 is mainly located in the vicinity of the lower end 21*b* (shown as an area 33 indicated by dots). When observed with reference to the slide tool 17, the ball 15 passes near the basal end of the slide groove (the side opposite to the cutting depth direction 2).

When the slide tool 17 is greatly contracted during machining, for example, the slide tool 17 moves like a trajectory 35. When the slide tool 17 rapidly extends, the slide tool 17 passes through a trajectory 37. Here, in the trajectory 37, the trajectory of the broken line portion is not limited as illustrated. For example, the trajectory 37 may move in −θ direction as indicated by a broken line. In addition, in a broken line portion of the trajectory 37, the slide tool 17 may momentarily jump upward.

Here, as shown in Equation (1), the displacement amount h is determined by the balance of the cutting torque T, the elastic force received from the compression coil spring 19, and the lead angle α.

$$F_0 + \frac{T}{r\tan\alpha} = k(h_0 + h) \qquad (1)$$

Here,
$F_0$: Vertical reaction force of the slide tool
T: Cutting torque
r: Radius of the slide shaft 17*a*
α: Lead angle
k: Spring constant of the compression coil spring 19
$h_0$: Contract amount of the compression coil spring 19 when the spring 19 is set
h: Displacement amount As disclosed in Patent Literature 1, when the motion of the core shaft has only one degree of freedom in the spiral direction, the core shaft cannot expand and contract with respect to the support sleeve without rotation when the cutting edge comes into contact with the workpiece 7. That is, the core shaft rotates relative to the support sleeve only by variations in the cutting torque. Then, in the tool of Patent Literature 1, the core shaft cannot expand and contract unless the cutting torque varies. Thus, when the distance between the deburring target portion 7*a* and the support sleeves varies, the expansion and contraction of the core shaft may be difficult to follow.

For example, when the core shaft first contacts the workpiece, the core shaft may not move smoothly in the spiral direction and may hit the workpiece strongly. In this case, the elastic force of the spring received by the core shaft and the cutting torque from biting into the workpiece vibrate, and the core shaft is likely to vibrate. The machined surface thus does not become smooth.

When the workpiece is rapidly separated from the sleeve, the expansion of the core shaft may not follow, and the core shaft may be separated from the workpiece. In this case, the chamfer amount tends to be small, and burrs tend to remain.

On the other hand, according to the deburring tool 10 of the present embodiment, the guide groove 17*b* has the displacement width w in a vertical direction. The slide shaft 17*a* thus moves freely in two directions of the spiral direction and the reciprocating direction with respect to the body 11 in accordance with the cutting torque received by the tip tool 17*c* from the workpiece 7 and the expansion and contraction of the compression coil spring 19. That is, the slide shaft 17*a* can expand and contract even when there is no variation in the cutting torque. Thus, when the distance between the deburring target portion 7*a* and the body 11 changes, the expansion and contraction of the slide shaft 17*a* easily follows the workpiece 7. The occurrence of vibration is thus suppressed when the slide tool 17 first comes into contact with the workpiece 7. Further, when the workpiece 7 is rapidly separated from the body 11, the machining amount is easily kept constant.

Second Embodiment

Figure 6:
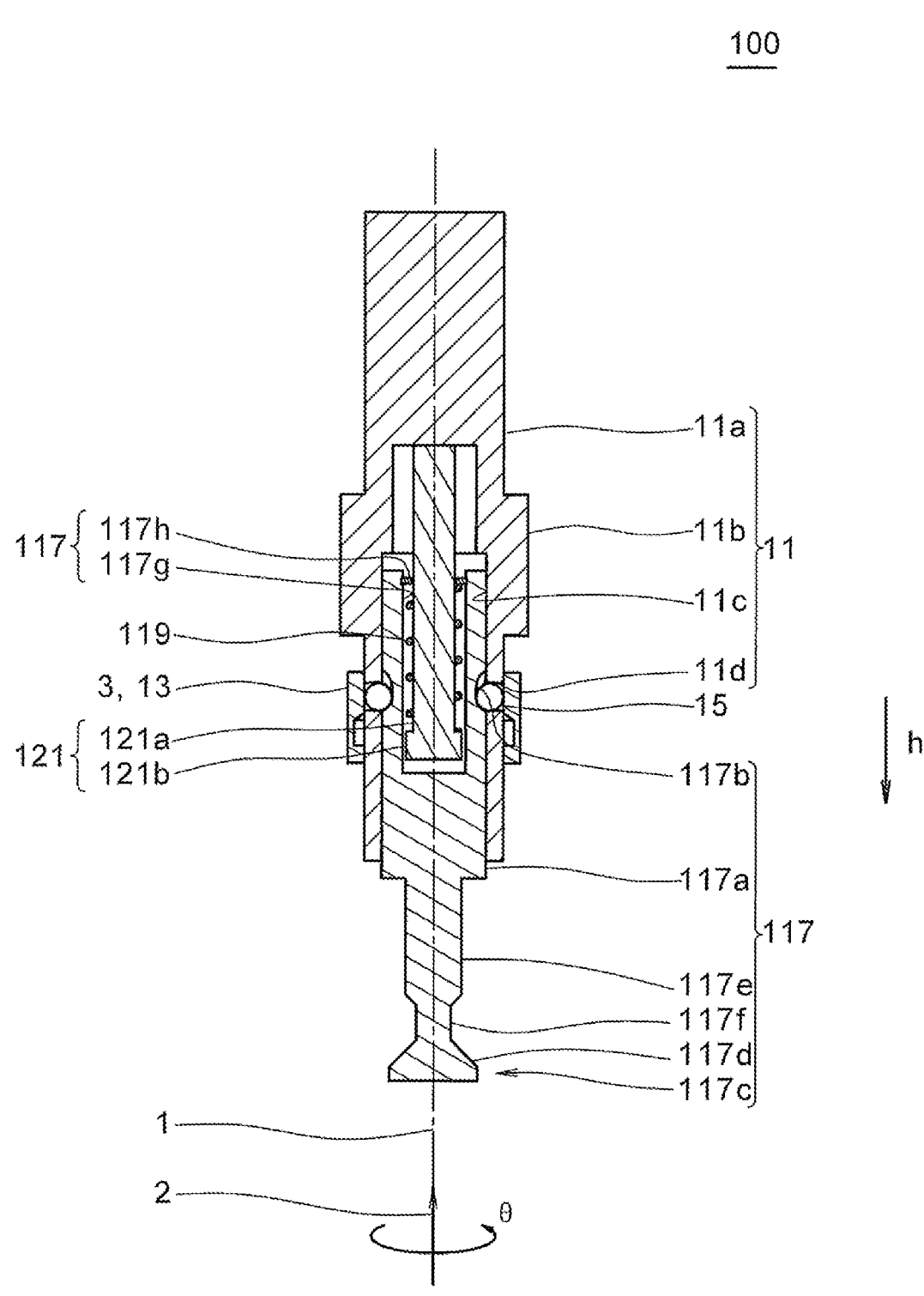
FIG. 6 is a longitudinal sectional view of a deburring tool according to a second embodiment.

As shown in FIG. 6, the deburring tool 100 of the present embodiment includes a body 11, a trigger 13, a ball 15, a slide tool 117, a compression coil spring (elastic body) 119, and a post 121. The slide tool 117 includes a cutting edge 117*d* facing toward the basal end. A cutting depth direction 2 of the deburring tool 100 is toward the basal end. The deburring tool 100 rotates in a clockwise direction as viewed toward the distal end (downward in FIG. 6). The deburring tool 100 scrapes the burr toward the basal end. The deburring tool 100 performs deburring on the back side of the workpiece 7 as viewed from the deburring tool 100.

The post 121 includes a spring guide 121*a* and a spring retainer 121*b*. The spring guide 121*a* extends toward the distal end along the central axis 1 from the bottom surface of the cylinder bore 11*c*. The spring retainer 121*b*, which has a disk shape or a columnar shape, is disposed at a distal end of the spring guide 121*a*.

Figure 7:
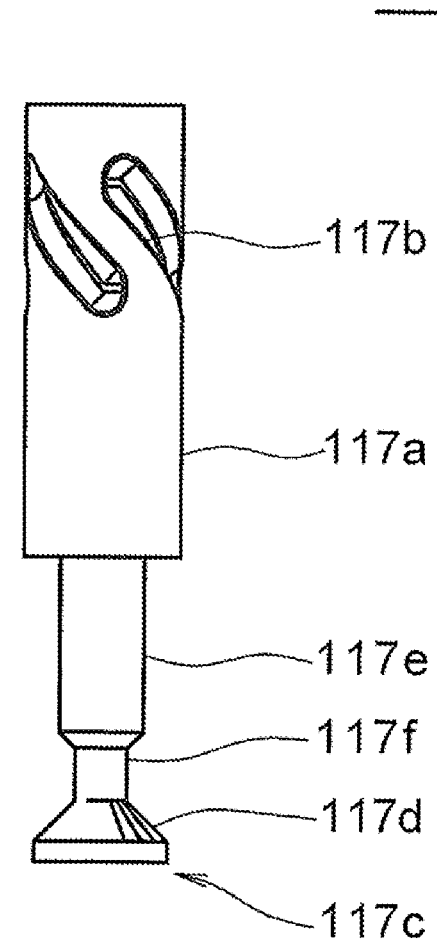
FIG. 7 is a front view of the slide tool according to the second embodiment.

As shown in FIG. 7, the slide tool 117 includes a slide shaft 117*a*, a guide groove 117*b*, a tip tool 117*c*, a stem 117*e*, a constriction 117*f*, a spring chamber 117*g*, and a stopper 117*h*. The slide shaft 117*a* is substantially the same as the slide shaft 17*a* of the first embodiment.

The stem 117*e*, the constriction 117*f*, and the tip tool 117*c* are arranged in this order at the distal end of the slide shaft 117*a*. The constriction 117*f* has a smaller diameter than the stem 117*e*. The tip tool 117*c* has a cutting edge 117*d*. The cutting edge 117*d* is arranged, for example, on a conical surface having an apex at the basal end. The cutting depth direction 2 of the cutting edge 117*d* is toward the basal end.

In FIG. 7, the slide tool 117 receives a cutting resistance in a counterclockwise direction as viewed from the top toward the bottom. The guide groove 117*b* generally spirals in the opposite direction of the cutting depth direction 2 (downward in FIG. 7) as it proceeds in the opposite direction (+θ) of the rotational direction of the deburring tool 100. Other configuration of the guide groove 117*b* is substantially the same as the guide groove 17*b* of the first embodiment. The relation between the displacement amount h (see FIG.

6) of the slide shaft 117*a* and the angular displacement θ (see FIG. 6) is substantially the same as that of FIG. 3. Here, it is assumed that the displacement amount h is positive toward the distal end.

The spring chamber 117*g* extends along the central axis 1 from the basal end to the central portion of the slide tool 117. The spring chamber 117*g* opens to the basal end of the slide tool 117. The stopper 117*h* is disposed at the basal end of the spring chamber 117*g*. The stopper 117*h* supports the compression coil spring 119. For example, the stopper 117*h* has a ring shape. For example, the stopper 117*h* is a retaining ring for a hole.

The compression coil spring 119 is disposed inside the spring chamber 117*g*. The compression coil spring 119 is mounted between the spring retainer 121*b* and the stopper 117*h* to be guided by the spring guide 121*a*. The compression coil spring 119 urges the slide tool 117 toward the basal end.

Third Embodiment

Figure 8:
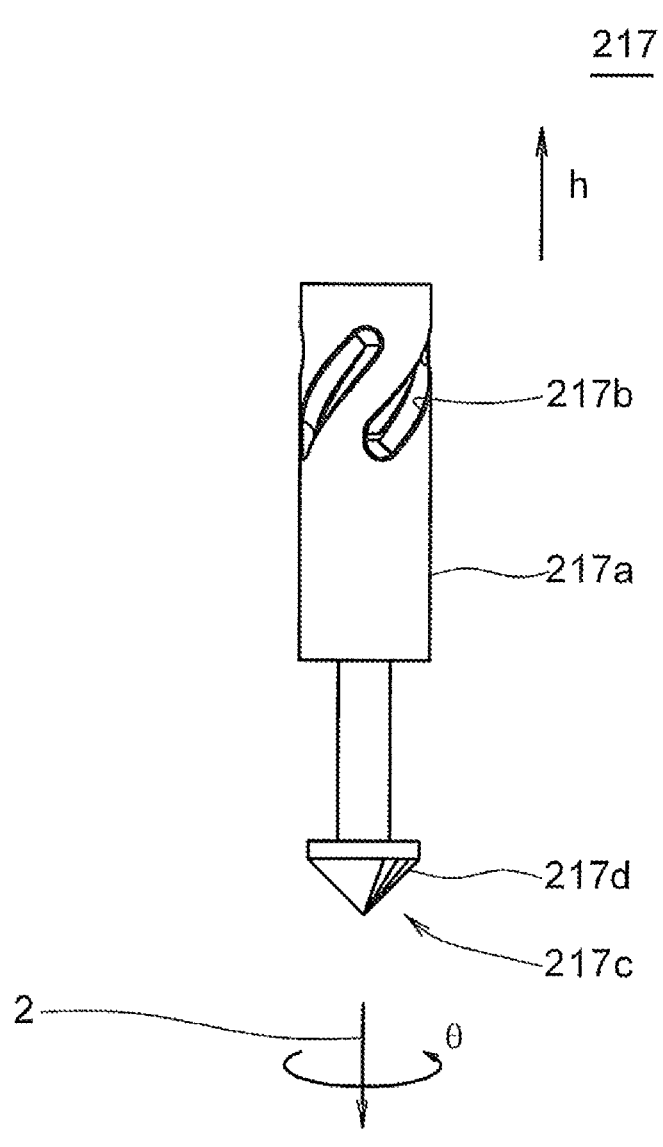
FIG. 8 is a front view of the slide tool according to a third embodiment.

As shown in FIG. 8, a slide tool 217 of the present embodiment includes a slide shaft 217*a*, a guide groove 217*b*, and a tip tool 217*c*. The tip tool 217*c* has a cutting edge 217*d* facing toward the distal end. The cutting depth direction 2 of the slide tool 217 is toward the distal end. Instead of the slide tool 17 of the first embodiment, the slide tool 217 is attached to the deburring tool 10. The deburring tool 10 with the slide tool 217 rotates in a clockwise direction as viewed toward the distal end (downward in FIG. 8). The deburring tool 10 performs deburring on the front side of the workpiece 7 as viewed from the deburring tool 10.

The slide shaft 217*a* is substantially the same as the slide shaft 17*a* of the first embodiment. The tip tool 217*c* is substantially the same as the tip tool 17*c* of the first embodiment.

Figure 9:
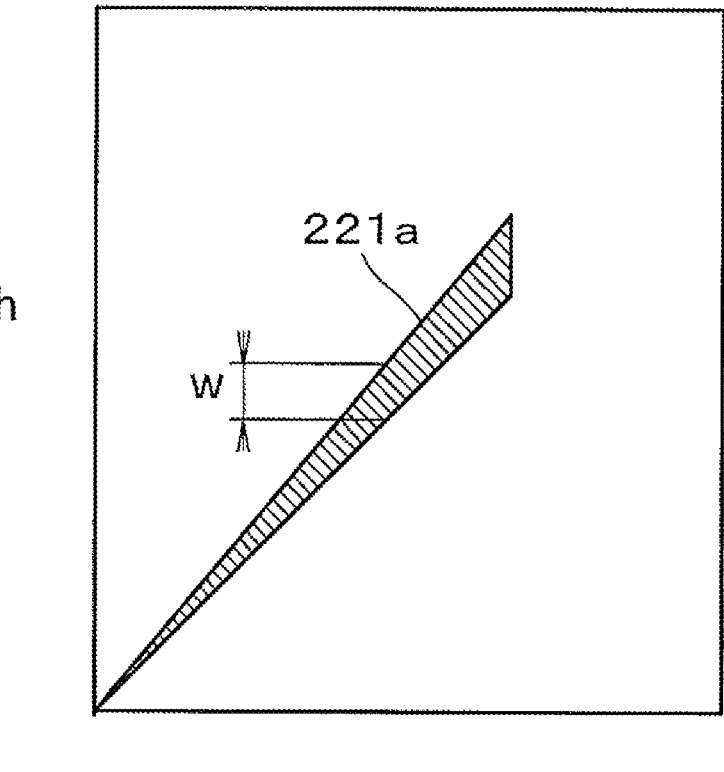
FIG. 9 shows a displacement curve of the slide shaft according to the third embodiment.

As shown in FIG. 9, in a movement area 221*a* of the slide shaft 217*a*, the displacement width w increases as the displacement amount h increases on the displacement curve. For example, as expressed by Equation (2), the displacement width w is a linear function of the angular displacement θ.

$$w = a\theta + b(a > 0, b > 0) \qquad (2)$$

$$b = 0 \text{ may be set.}$$

b=0 may be set.

As shown in FIG. 1, the compression coil spring 19 urges the slide tool 217. Thus, as the displacement amount h increases, the force by which the slide shaft 217*a* is pushed out increases. The force by which the slide shaft 217*a* is pushed out is the thrust force exerted by the cutting edge 217*d* on the workpiece 7. The slide tool 217 of the present embodiment allows to apply the displacement width w corresponding to the thrust force of the cutting edge 217*d*. That is, when a large thrust force is applied, the cutting edge 217*d* can be largely released. This easily finishes the machined surface after the deburring process smoothly.

The present invention is not limited to the above-described embodiments, and various modifications can be made without departing from the gist of the present invention, and all technical matters included in the technical idea described in the claims are the subject of the present invention. While the above embodiments have been shown by way of example, those skilled in the art will recognize that various alternatives, modifications, variations, and improvements can be made from the disclosure herein, which fall within the scope of the appended claims.

REFERENCE SIGNS LIST

10, 100 Deburring tool
11 Body
11*c* Cylinder bore
15 Ball (pair of anti-rotation bodies)
17*a*, 117*a*, 217*a* Slide shaft
17*b*, 117*b*, 217*b* Guide groove
17*c*, 117*c*, 217*c* Tip tool
19, 119 Compression coil spring (elastic body)

What is claimed is:

1. A deburring tool comprising:
a body having a cylinder bore;
an anti-rotation body protruding toward inside of the cylinder bore;
a cylindrical slide shaft to which a tip tool is attachable, the slide shaft configured to reciprocate inside the cylinder bore in a rotatable manner with respect to the body, the slide shaft including,
a guide groove located on an outer cylindrical surface to receive the anti-rotation body, the guide groove having a displacement width for the slide shaft to be axially displaceable with respect to the anti-rotation body, the guide groove configured to move the slide shaft with respect to the body in an opposite direction to a cutting depth direction of the tip tool as the guide groove receives cutting resistance in a rotational direction, the displacement width being an amount that the slide shaft is movable axially when a rotational position of the slide shaft with respect to the body does not change; and
an elastic body configured to urge the slide shaft toward the cutting depth direction.

2. The deburring tool according to claim 1, wherein the body has an anti-rotation hole,
the deburring tool further comprises:
a trigger disposed around the body to reciprocate between a machining position and a detaching detachable position, the trigger including,
a holding surface covering the anti-rotation hole to protrude the anti-rotation body toward the guide groove when the trigger is at the machining position, and
a relief portion configured to receive the anti-rotation body when the trigger is at the detachable position.

3. The deburring tool according to claim 1, further comprising:
a cutting edge facing toward the cutting depth direction.

4. The deburring tool according to claim 3, wherein the body has an anti-rotation hole,
the deburring tool further comprises:
a trigger disposed around the body to reciprocate between a machining position and a detaching detachable position, the trigger including,
a holding surface covering the anti-rotation hole to protrude the anti-rotation body toward the guide groove when the trigger is at the machining position, and
a relief portion configured to receive the anti-rotation body when the trigger is at the detachable position.

5. The deburring tool according to claim 1, wherein the anti-rotation body is a ball.

6. The deburring tool according to claim 5, further comprising:

a cutting edge facing toward the cutting depth direction.

7. The deburring tool according to claim 5, wherein the body has an anti-rotation hole, the deburring tool further comprises:

a trigger disposed around the body to reciprocate between a machining position and a detaching detachable position, the trigger including, a holding surface covering the anti-rotation hole to protrude the anti-rotation body toward the guide groove when the trigger is at the machining position, and a relief portion configured to receive the anti-rotation body when the trigger is at the detachable position.

8. The deburring tool according to claim 1, wherein the guide groove has a displacement amount proportional to an angular displacement at an end portion opposite to the cutting depth direction.

9. The deburring tool according to claim 8, wherein the anti-rotation body is a ball.

10. The deburring tool according to claim 8, further comprising:

a cutting edge facing toward the cutting depth direction.

11. The deburring tool according to claim 8, wherein the body has an anti-rotation hole, the deburring tool further comprises:

a trigger disposed around the body to reciprocate between a machining position and a detaching detachable position, the trigger including, a holding surface covering the anti-rotation hole to protrude the anti-rotation body toward the guide groove when the trigger is at the machining position, and a relief portion configured to receive the anti-rotation body when the trigger is at the detachable position.

12. The deburring tool according to claim 1, wherein the guide groove has a spiral shape, and the displacement width is substantially constant along an entire length of the guide groove.

13. The deburring tool according to claim 12, wherein the guide groove has a displacement amount proportional to an angular displacement at an end portion opposite to the cutting depth direction.

14. The deburring tool according to claim 12, wherein the anti-rotation body is a ball.

15. The deburring tool according to claim 12, further comprising:

a cutting edge facing toward the cutting depth direction.

16. The deburring tool according to claim 12, wherein the body has an anti-rotation hole, the deburring tool further comprises:

a trigger disposed around the body to reciprocate between a machining position and a detaching detachable position, the trigger including, a holding surface covering the anti-rotation hole to protrude the anti-rotation body toward the guide groove when the trigger is at the machining position, and a relief portion configured to receive the anti-rotation body when the trigger is at the detachable position.

* * * * *